United States Patent
Ronchi

(12) 
(10) Patent No.: US 11,505,412 B2
(45) Date of Patent: Nov. 22, 2022

(54) DEVICE FOR SELECTING AND DISCARDING PUCKS IN APPARATUS FOR COUPLING SUCH PUCKS TOGETHER WITH BOTTLES TO BE FILLED

(71) Applicant: RONCHI MARIO S.P.A., Gessate (IT)

(72) Inventor: Cesare Ronchi, Gessate (IT)

(73) Assignee: RONCHI MARIO S.P.A., Gessate (IT)

( * ) Notice: Subject to any disclaimer, the term of this patent is extended or adjusted under 35 U.S.C. 154(b) by 0 days.

(21) Appl. No.: 17/292,598

(22) PCT Filed: Nov. 15, 2019

(86) PCT No.: PCT/IB2019/059835
§ 371 (c)(1),
(2) Date: May 10, 2021

(87) PCT Pub. No.: WO2020/104906
PCT Pub. Date: May 28, 2020

(65) Prior Publication Data
US 2022/0002092 A1    Jan. 6, 2022

(30) Foreign Application Priority Data

Nov. 21, 2018   (IT) .......................... 102018000010484

(51) Int. Cl.
*B65G 43/08*    (2006.01)
*B65G 47/76*    (2006.01)
*B65G 47/84*    (2006.01)
*B65G 47/52*    (2006.01)

(52) U.S. Cl.
CPC ............. *B65G 43/08* (2013.01); *B65G 47/52* (2013.01); *B65G 47/766* (2013.01); *B65G 47/846* (2013.01); *B65G 2201/0244* (2013.01); *B65G 2201/0261* (2013.01); *B65G 2203/0283* (2013.01); *B65G 2207/40* (2013.01)

(58) Field of Classification Search
CPC ................ B65G 47/266; B65G 47/846; B65G 2201/0261; B65G 47/71; B65G 43/08; B65G 47/52; B65G 2203/0283; B65G 2201/0244
USPC .......................................... 198/370.1, 457.07
See application file for complete search history.

(56) References Cited

U.S. PATENT DOCUMENTS

| | | | | |
|---|---|---|---|---|
| 3,363,741 A | * | 1/1968 | Dierksheide | B65G 47/82 |
| | | | | 198/457.07 |
| 4,158,624 A | * | 6/1979 | Ford | B65G 47/766 |
| | | | | 209/523 |
| 4,760,908 A | * | 8/1988 | Houghton | B65G 47/844 |
| | | | | 198/477.1 |
| 6,814,533 B1 | * | 11/2004 | Prud'Homme | B65G 47/5131 |
| | | | | 414/676 |

(Continued)

FOREIGN PATENT DOCUMENTS

| EP | 3196653 | * | 7/2017 | ............. B65G 47/84 |
|---|---|---|---|---|
| GB | 2107666 | * | 9/1982 | ............. B65G 47/68 |
| WO | 2019/048155 | * | 3/2019 | ............... B07C 5/34 |

*Primary Examiner* — James R Bidwell

(57) ABSTRACT

A device for selecting and discarding pucks (2,3) for holding bottles (1) with a support and travel plane (110), a plurality of teeth (120) where the teeth (120) are arranged in the plane (110) to form a routing path towards a discarding path (OUT2) for discarding empty pucks (2) without a bottle (1) and a routing path towards an exit path (OUT3) for outputting full pucks (3) containing a bottle (1).

16 Claims, 5 Drawing Sheets

(56) References Cited

U.S. PATENT DOCUMENTS

| | | | | |
|---|---|---|---|---|
| 8,757,352 B1* | 6/2014 | Daboub | ................. | B07C 3/065 |
| | | | | 198/457.07 |
| 10,983,138 B2* | 4/2021 | Schacher | ............... | G01N 35/04 |
| 2016/0214799 A1* | 7/2016 | Walter | ................. | B67C 7/0013 |
| 2020/0361717 A1* | 11/2020 | Bauer | .................. | B07C 5/3404 |

* cited by examiner

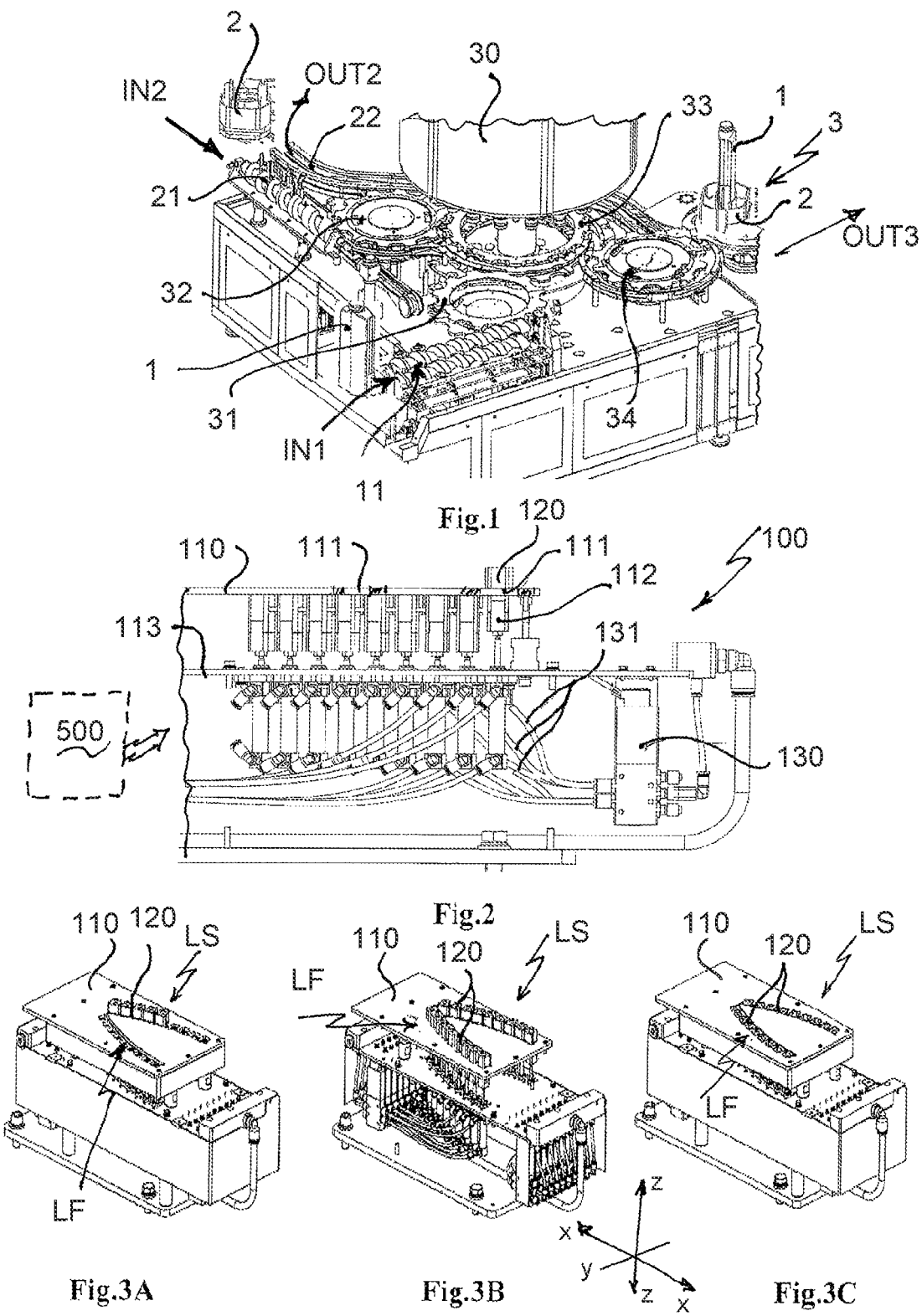

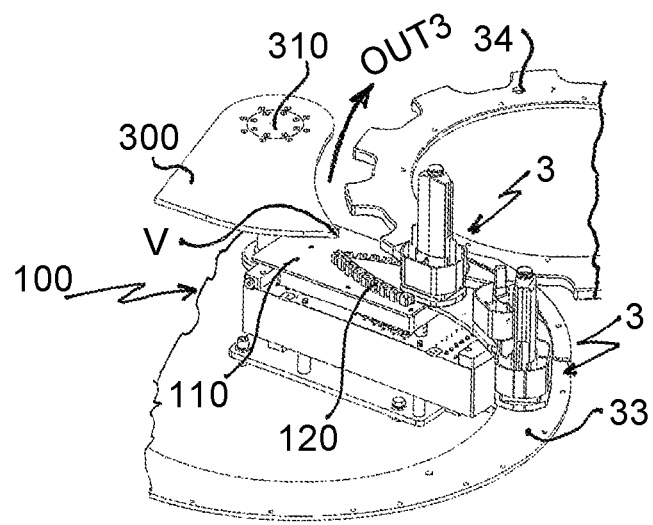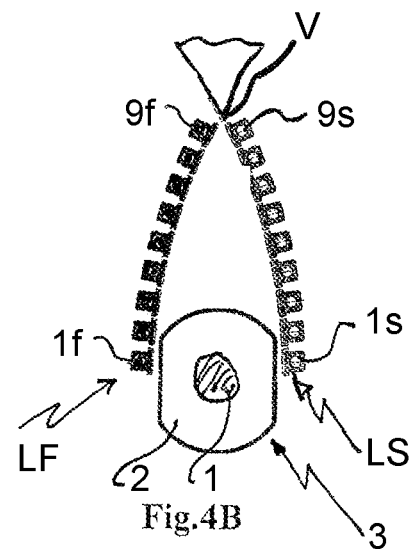
Fig.4A     Fig.4B
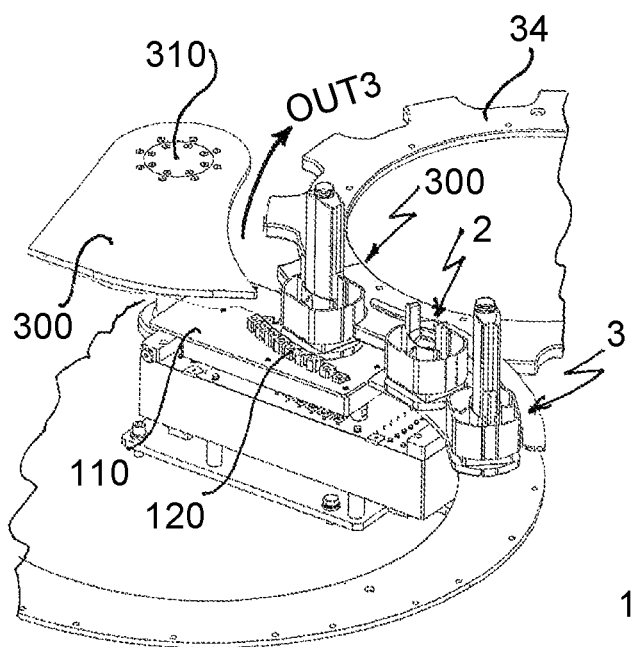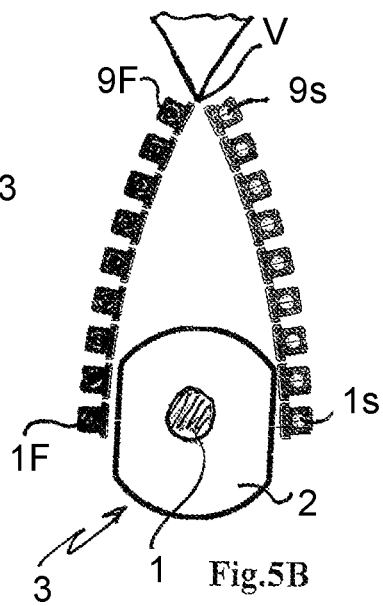
Fig.5A     Fig.5B

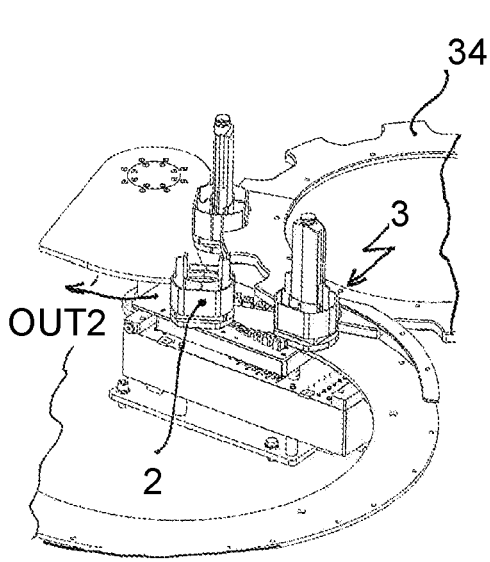 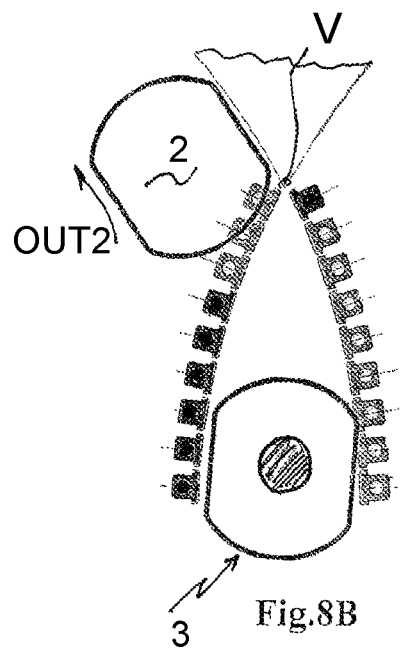
Fig.8A  Fig.8B
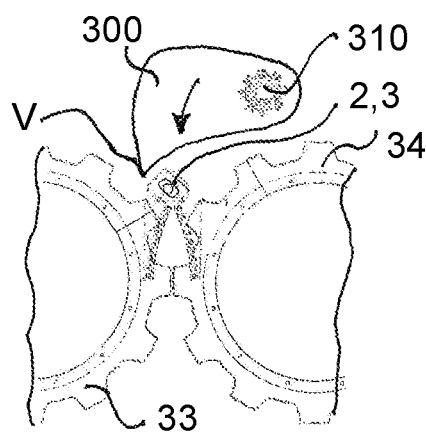 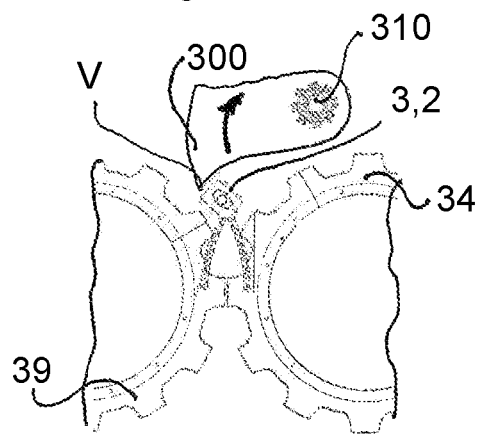
Fig.9A  Fig.9B
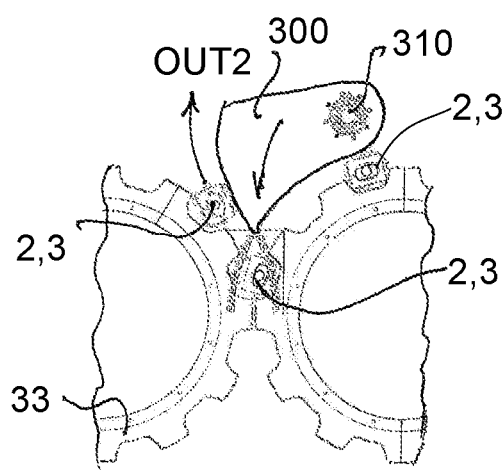
Fig.9C

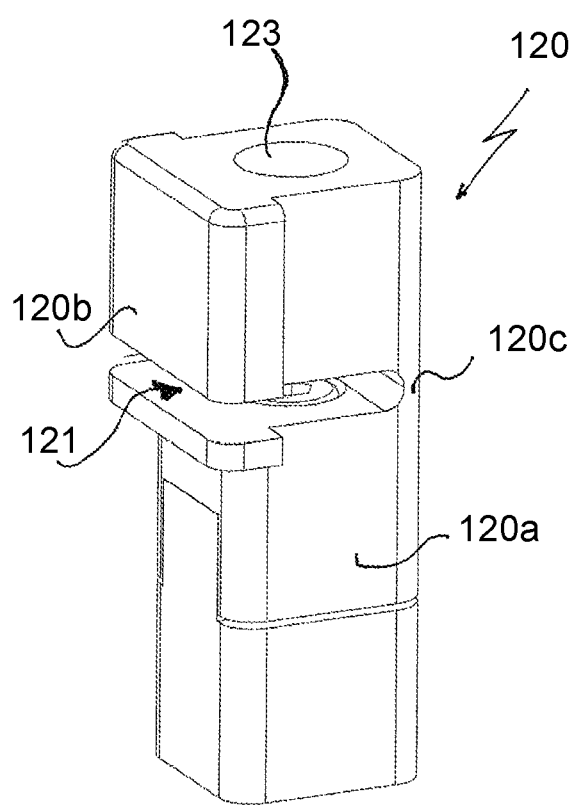 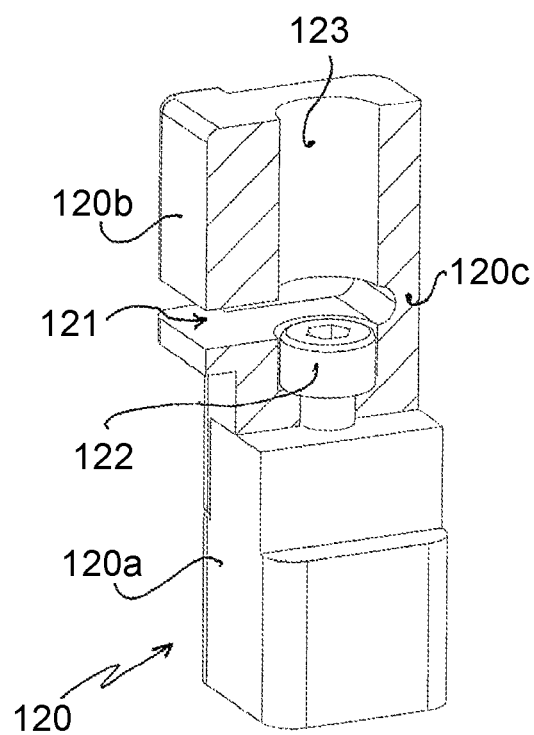
Fig.10A                    Fig.10B

DEVICE FOR SELECTING AND DISCARDING PUCKS IN APPARATUS FOR COUPLING SUCH PUCKS TOGETHER WITH BOTTLES TO BE FILLED

BRIEF SUMMARY OF THE INVENTION

The present invention relates to a device and a method for selecting and discarding pucks in apparatus for coupling such pucks together with bottles to be filled.

It is known, in the technical sector for packaging bulk products by means of automatic lines such as those comprising among other things at least one machine for filling said containers that the containers must be conveyed underneath corresponding nozzles for dispensing the product to be packaged and then to the sealing station using programmed and synchronized sequences.

Also known are containers in the form of bottles which are not designed to maintain autonomously a correct erect position when passing through said machines; in such cases special supports, called "pucks", designed to contain the bottles for ensuring correct positioning thereof during the various processing steps, are used.

These steps include a preliminary step for performing feeding to a corresponding apparatus (referred to below as "coupling apparatus") in which the bottles, supplied by a respective reordering machine, are inserted into the pucks supplied by a corresponding line for storing and feeding them; at the end of the coupling operation, the pucks with the corresponding bottle are conveyed away for subsequent filling.

Although apparatus designed to perform said coupling together of puck and bottle are known, it happens that said operation is not performed with 100% successful results and therefore there exists the need to prevent the conveying of an empty puck to the following filling stage by selecting it and discarding it beforehand so that it does not penalize the performance of the downstream filling machine which would be subject to unnecessary downtime while waiting for the empty passage of a puck without a bottle and the arrival of the next puck with a bottle.

The technical problem, which is posed, therefore, is to provide a device designed to distinguish and select pucks without a bottle from pucks with a bottle so as allow discarding of the former and conveying of the latter to a following station, in particular a filling station.

In connection with this problem it is also required that such a device should have small dimensions, be easy and inexpensive to produce and assemble and in particular be able to perform the selection with the high speed imposed by the speed of the filling lines so as not to reduce the overall productivity of the said lines, slowing down the bottle feeding speed.

In addition to the above it is also desirable that the selection and discarding device should not introduce downtime for resuming the cycle in the event of malfunctioning of the said device.

These results are achieved according to the present invention by a device for selecting pucks without a container in feeding apparatus of filling machines or the like according to the characteristic features as described and claimed.

Therefore, a device for selecting and discarding bottle-holder pucks according to the invention is characterized by a plurality of teeth arranged in a plane along an exit line defining a routing path for full pucks and a plurality of said teeth arranged in the plane along a discarding line defining a path for empty pucks. Selective operation for raising or lowering the teeth of one and/or the other exit/discarding line in the vertical direction also causes the extraction/retraction thereof from/into the plane, in a controlled sequence and in a manner coordinated with the teeth of the other line defining the other one of said paths. In this way a line for guiding a full or empty puck along the respective exit or discarding routing path is formed.

The device according to the present invention is therefore able to discard pucks without a bottle and to exit pucks with a bottle to be conveyed to suitable downstream stations, thus ensuring not only that 100% of the full pucks are conveyed away to the following stations, but also that high speeds for feeding bottles to the latter are maintained, as required by the latest packaging systems.

The patent relates furthermore to an apparatus according to the characteristic features as claimed and to a method according to the characteristic features as claimed.

BRIEF DESCRIPTION OF THE VIEWS OF THE DRAWINGS

Further details may be obtained from the following description of a non-limiting example of embodiment of the subject of the present invention provided with reference to the attached drawings in which:

FIG. 1 shows a perspective view of an apparatus for feeding pucks and bottles, provided with a selection and discarding device according to the present invention;

FIG. 2 shows a side view of the device according to the invention;

FIGS. 3A-3C show perspective views of the device according to FIG. 2 during different stages of operation;

FIGS. 4A-4B show views of the device according to the invention during entry of a first puck with container;

FIGS. 5A-5B show views of the device according to the invention during selection of the first puck with container;

FIGS. 8A-8B show views of the device according to the invention during exiting/discarding of the puck without container and entry of a following puck with container; and FIGS. 9A-9B show views of the detail of the means which intervene in the event of malfunctioning of the selection device;

FIG. 10A shows a perspective view of a preferred embodiment of a tooth according to the invention;

FIG. 10B shows a schematic partial cross-section along a vertical plane of the tooth according to FIG. 10A.

DETAILED DESCRIPTION OF THE INVENTION

Figure 6A:
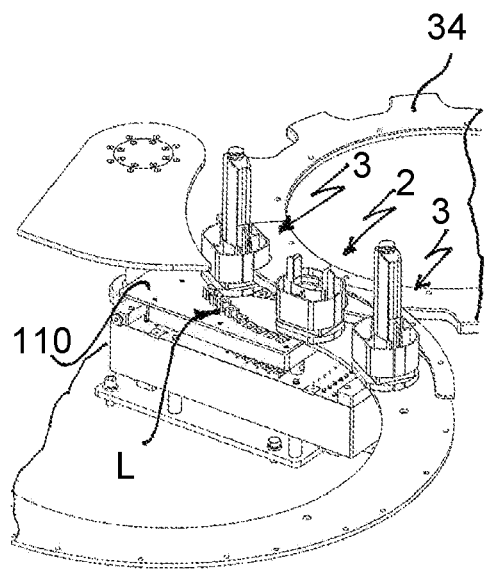
FIGS. 6A-6B show views of the device according to the invention during exiting therefrom of the first puck with container.

As shown in FIG. 1 and identifying conventionally a set of three axes, i.e. longitudinal axis X-X along the length of a plane forming part of the device according to the invention; transverse axis Y-Y perpendicular to the preceding direction along the width of said plane and vertical direction Z-Z perpendicular to said plane, an apparatus for coupling bottles 1 together with respective pucks 2 comprises: means 11 for feeding the bottles along a preferred direction IN1, means 21 for feeding the pucks along a second preferred direction IN2, means 22 for exiting discarded empty pucks along a discarding path OUT2; a device 30 for coupling bottles 1 together with empty pucks 2 so as to form a full puck 3, i.e. a puck coupled with a bottle; although shown in a preferred orthogonal arrangement, it is envisaged that the entry directions IN1,1N2 can in any case be adjusted.

The coupling device 30 comprises among other things a star wheel 31 for feeding bottles, a star wheel 32 for feeding pucks 2, a star wheel 33 for feeding full pucks 3, a star wheel 34 for guiding the pucks towards the exit OUTS of the apparatus, which is normally connected to following machinery, for example filling machinery, arranged downstream in the direction of advancing movement of the bottles; the various elements described above are conventional per se and not described in detail.

The coupling apparatus comprises a selection and discarding device 100 according to the invention which comprises essentially:

- a support and travel plane X-Y 110, extending parallel to the longitudinal direction X-X and transverse direction Y-Y and provided with openings 111 having a vertical axis Z-Z perpendicular to said plane X-Y and passing through it;
- a plurality of teeth 120 housed inside said through-holes 111 and displaceable in the vertical direction Z-Z from a position retracted inside the hole 111, so as to be coplanar with the plane 110, into an extracted position, projecting from said plane in the vertical direction, as shown in FIGS. 3A-3C; the teeth 120 are preferably arranged in the plane 110 along two lines, i.e. a line LS (discarding line) and a line LF (exit line), which is preferably curved and convergent towards a vertex V.

The teeth of the discarding line LS, in the extracted position, define a routing path towards the discarding path OU2 for discarding empty pucks 2 without a bottle 1. The teeth of the exit line LF define instead a routing path towards an exit path OUTS for outputting full pucks 3 containing a bottle 1. Preferably, the two lines LS,LF are a mirror image of each other in the plane X-Y relative to a longitudinal axis passing through the vertex V.

The radius of curvature of the two lines may be defined according to the size of the pucks in transit in the plane X-Y of the device, so as to allow the pucks to follow, without obstacles, the respective routing path towards the discarding or the exit point.

For easier description, the teeth of the line LS are identified by the reference numbers/symbols 1S-9S and the teeth of the line LF by the reference numbers/symbol 1F-9F. Moreover, the teeth shown as "full" are understood as being raised in a position projecting from the plane 110, while the "empty" teeth are understood as being lowered.

The quantity of teeth shown for each line is purely indicative for the needs of description and it is understood that the two lines may comprise any number of teeth suitable for the function.

The movement of the teeth is determined by suitable actuating means, for example double-acting pneumatic cylinders 112, which are arranged between the plane 110 and a second plane 113, parallel to the first plane, and are supplied by a control unit 130 via respective pipes 131.

As will become clearer below, a control unit 500 is able to perform the selective operation of the teeth so as to cause them to be extracted or retracted from/into the plane 110 in a controlled sequence.

The device 100 is preferably arranged between the star wheel 33 for feeding the full pucks and the star wheel 34 for exiting the same from the coupling apparatus.

In detail, the plane 110 may be arranged at a height in the vertical direction Z-Z less than that of the star wheels 33,34 so as to form a travel plane for the pucks which may or may not be coupled with a respective bottle 1 exiting the coupling star wheel 33.

It is also envisaged that the device should be designed to receive signals emitted by detection means (for example one or more sensors) designed to detect the presence of the bottle in the puck (puck full or empty) and designed to emit a corresponding signal for identification of a full or empty puck to be sent to the control unit 500.

The device may also be configured to receive data indicating the position of a puck in transit on the plane X-Y.

In particular, according to a preferred configuration, the position, in particular the angular position, of each puck in transit on the travel plane may be determined by suitable means such as encoders, associated with each motor—preferably of the brushless type—for operating the star wheels of the apparatus, which rotate in synchronism with each other following initial setting thereof with respect to a predetermined reference point.

In this way the angular position of each seat of the star wheels also determines the angular position of the corresponding puck transported by the star wheel; the corresponding position information may be sent to the control unit 500 which, on the basis of the same, causes sequential extraction/retraction of the teeth of the selection/discarding device depending on the position of the puck in transit along the plane X-Y, determining the formation of the routing path towards the exit or routing path towards the discarding point, which must be followed by the puck.

Figure 6B:
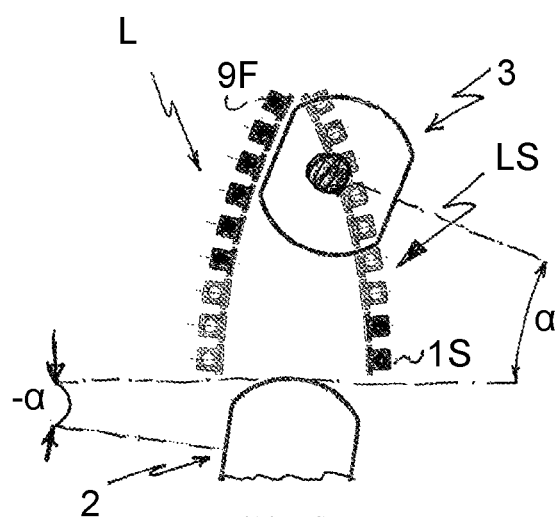
Figure 7A:
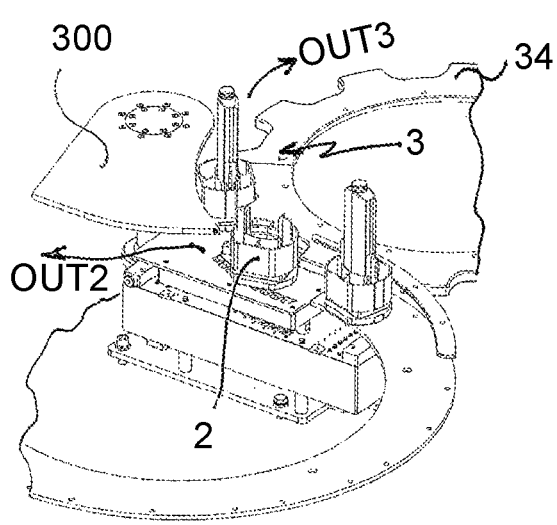
FIGS. 7A-7B show views of the device according to the invention during entry therein of a puck without container.
Figure 7B:
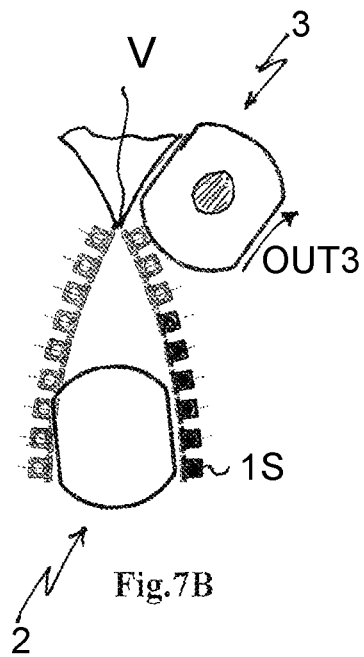

With this configuration and following preliminary identification of an incoming puck as a full puck 3 or empty puck 2 by first sensors which are situated generally on the outside of the device and are designed to send a corresponding signal to the control unit 500 for operation of the teeth 120, the device is able to operate as follows:

a) preparing the device 100 with the teeth 1S-9S and 1F-9F all lowered into a position coplanar with the travel plane 110;

b) feeding a series of full pucks 3 and/or empty pucks 2 to the support and travel plane 110 (FIGS. 4A, 4B);

c) receiving a signal identifying the instantaneous angular position a of the incoming puck 3,2 during transit through the selection and discarding device 100;

d) if the puck is identified as full 3: raising, gradually and in sequence along the travel path of the puck, the teeth 1F-9F of the exit line LF so as to form a guiding line for the full puck 3 along a routing path towards the exit OUTS, keeping lowered the teeth of the discarding line LS (FIGS. 6A,6B) so as to allow the transit of the full puck 3 on the plane 110 towards the exit OUT3;

e) if the puck is identified as empty 2 (FIGS. 7a,7b): lowering in sequence the teeth 1F-9F of the exit line LF and simultaneous gradual extraction in succession of the teeth 1S-9S of the discarding line LS, so as to determine a routing line for the empty puck 2 along a routing path towards the exit path OUT2;

f) feeding a following puck to the travel plane 100;

g) repeating steps a) to e).

It is therefore clear how by means of the selection and discarding device, owing to control of the gradual raising/lowering of the teeth of the two lines, i.e. discarding line LS and exit line LF, it is possible to ensure not only that 100% of the full pucks are conveyed to the following filling stages, but also that high feeding speeds of the bottles to said stages are maintained, as required by the latest packaging systems.

According to a further preferred embodiment it is also envisaged that the selection and discarding device according to the invention may comprise a suitably shaped element 300 with curved edges for forming the said vertex V and the two paths, i.e. exit path OUT3 and discarding path OUT2; the element 300 is preferably rotatable about a pin 310 and kept in the position for definition of the vertex V by a mechanical torque limiter combined with a sensor, the limit resistance threshold of which is less than any thrusting force exerted by a puck on the said element; in this way, should an incoming full puck 3 (FIG. 9A) or empty puck (not shown), instead of continuing along the respective exit path OUT3 or discarding path OUT2, jam against the vertex V (FIGS. 9A-9B), the element 300 will give away, rotating about the pin 310, and causes stoppage of the machine so as to allow intervention by the operator who, depending on the situation, will extract the puck or direct it to the discarding belt OUT2, restoring the synchronism of the various moving parts of the apparatus.

As shown in FIGS. 10A, 10B, it is envisaged that each tooth 120 may have a transverse incision 121 with a length slightly smaller than the width of the tooth so as to divide up the same into two parts, i.e. a bottom stump part 120a and top crown part 120b, which are joined together only by a thin vertical strip 120c.

The stump is fastened to a respective cylinder 131 by means of a screw 122 which can be operated through a through-hole 123 formed in the crown 120b.

With this design of the tooth 120, any malfunctioning of the device causes a thrusting action, in the tangential direction, of the puck on the tooth/teeth 120, following which the crown 120b bends, breaking the strip 122c, thus causing at the same time stoppage of the machine; with the machine stopped it will be possible to extract the broken tooth by unscrewing the screw 122, implant a new tooth, tighten the screw 122 again and restart the machine.

In order to avoid more serious damage, the particular form of the teeth is such that the maintenance time is reduced, resulting also in limitation of the downtime of the machine, to the advantage of the overall productivity. Although described in connection with a number of embodiments and a number of preferred examples of implementation of the invention, it is understood that the scope of protection of the present patent is determined solely by the claims below.

The invention claimed is:

1. A device for selecting and discarding pucks (2,3) for holding bottles (1), comprising:
   a support and travel plane (110) extending parallel to a longitudinal direction (X-X) and to a transverse direction (Y-Y) and provided with openings (111) having a vertical axis (Z-Z) perpendicular to said plane (X-Y) and passing through the latter;
   a plurality of teeth (120), each housed inside a corresponding opening of said through-openings (111),
   a plurality of said teeth (120) being arranged in the plane (110) along a discarding line (LS) defining a routing path towards a discarding path (OUT2) for discarding empty pucks (2) without bottles (1),
   and a plurality of said teeth (120) being arranged in the plane (110) along an exit line (LF) defining a routing path towards an exit path (OUT3) for outputting full pucks (3) containing a bottle (1),
   each tooth being displaceable with a raising movement or lowering movement in the vertical direction (Z-Z) between a position retracted inside the opening (111) so as to not interfere with transit on the plane (110) of a puck (2,3), preferably coplanar with the plane (110), and an extracted position projecting from said plane in the vertical direction (Z-Z),
so as to define one or the other of said routing paths towards the exit path (OUT3) or discarding path (OUT2),
wherein the device is configured to perform selectively the raising or lowering movement of the teeth (120) of one and/or the other exit/discarding line (LF,LS) in the vertical direction (Z-Z) so as to extract/retract them from/into the plane (110), in a controlled sequence and in a manner coordinated with the teeth (1F-9F; 1S-9S) of the other line (LS, LF) defining the other one of said paths, so as to form a line for guiding a full puck (3) or empty puck (2) along the respective routing path.

2. The device according to claim 1, wherein the discarding line (LS) and the exit line (LF) are curved and preferably convergent towards a vertex (V).

3. The device according to claim 1 comprising the discarding line (LS) and the exit line (LF) are a mirror image of each other in the plane (X-Y) relative to a longitudinal axis passing through a vertex (V) towards which the discarding line (LS) and the exit line (LF) are convergent.

4. The device according to claim 2 where a radius of curvature of the two lines is designed to ensure hitch-free passage of the pucks in transit on the device.

5. The device according to claim 1 wherein the device is configured to receive a signal identifying the angular position (a) of a puck in transit along the plane (X-Y).

6. The device according to claim 1 wherein said teeth (120) can be actuated individually so as to be displaced in both senses of the vertical direction (Z-Z) by respective double-acting pneumatic cylinders (112) which are arranged between the support and travel plane (110) and a second plane (113) parallel thereto and are preferably supplied by a control unit (130) via respective pipes (131).

7. The device according to claim 1 comprising a control unit (500) designed to cause the selective operation of the teeth (120) of one and/or the other of the exit or discarding line (LF,LS) in the vertical direction (Z-Z) so that they are extracted from or retracted into the plane (110) in a controlled sequence, based on a prior identification of a puck as full (3) or empty (2).

8. The device according to claim 1 wherein the extraction/retraction of the teeth (120) from/into the plane (110) in a controlled sequence is performed depending on an instantaneous angular position (a) of the empty/full puck which is in transit in the device.

9. The device according to claim 1 comprising a shaped element (300) with curved edges for defining a vertex (V) towards which the discarding line (LS) and the exit line (LF) are convergent and the two paths for exiting (OUT3) the full pucks (3) and for discarding (OUT2) the empty pucks (2).

10. The device according to claim 9 wherein the shaped element (300) is rotatable about a pivot pin (310) and is kept in the position for defining the vertex (V) by a torque limiter which is combined with a sensor and the resistive force of which is less than a thrusting force exerted by a puck which may act on the shaped element itself.

11. The device according to claim 1 wherein each tooth (120) has a transverse incision (121) with a length slightly smaller than the width of the tooth so as to divide the tooth in two parts, i.e. a bottom stump part (120a) and a top crown part (120b), which are joined together only by a vertical strip (120c).

12. The device according to claim 11 wherein the stump part is fixed to an actuating cylinder (131), preferably by means of a vertical screw (132).

13. An apparatus for coupling bottles (2) with pucks (3), comprising a selection and discarding device according to claim 1.

14. The apparatus according to claim 13, comprising a means (11) for feeding the bottles in a feeding direction (IN1), means (21) for feeding the pucks in a second feeding direction (IN2), means (22) for exiting discarded empty pucks (2) along the discarding path (OUT2), a device (30) for coupling bottles (1) with empty pucks (2) to form a full puck (3) carrying a bottle, means (34) for exiting the full pucks (39) along the exit path (OUT3).

15. The apparatus according to claim 13, comprising a first sensor means for identifying full pucks (3) or empty pucks (2), designed to detect the presence of a bottle inside a puck and send a corresponding signal to the selection and discarding device.

16. A method for selecting/discarding full pucks (3) or empty pucks (2) by means of a selection/discarding device according to claim 1, comprising the steps of:
   a) feeding a series of full pucks (3) and/or empty pucks (2) towards the supporting and travel plane (110);
   b) identifying an incoming puck as a full puck (3) or empty puck (2);
   c) receiving a signal identifying the instantaneous position, in particular an angular position, of the puck (3,2) during transit through the selection and discarding device (100);
   d) if the puck is identified as a full puck: raising in a controlled sequence, along the puck travel path, the teeth (1F-9F) of the exit line (LF) so as to form a line for guiding the full puck (3) along the routing path towards the exit path (OUT3), keeping lowered or lowering in a coordinated manner the teeth of the discarding line (LS) so as to allow transit of the full puck (3) on the plane (110) towards the exit path (OUT3);
   e) if the puck is identified as empty (2): raising gradually and in a controlled sequence the teeth (1S-9S) of the discarding line (LS), keeping lowered or lowering in a coordinated manner the teeth (1F-9F) of the exit line (LF), along the puck travel path, so as to define a line for guiding the empty puck (2) along the routing path towards the discarding path (OUT2);
   f) feeding a following puck to the travel plane (100);
   g) repeating steps a) to e).

* * * * *